Feb. 13, 1951 — H. V. REED — 2,541,611
CLUTCH RELEASE
Filed May 16, 1946 — 2 Sheets-Sheet 1
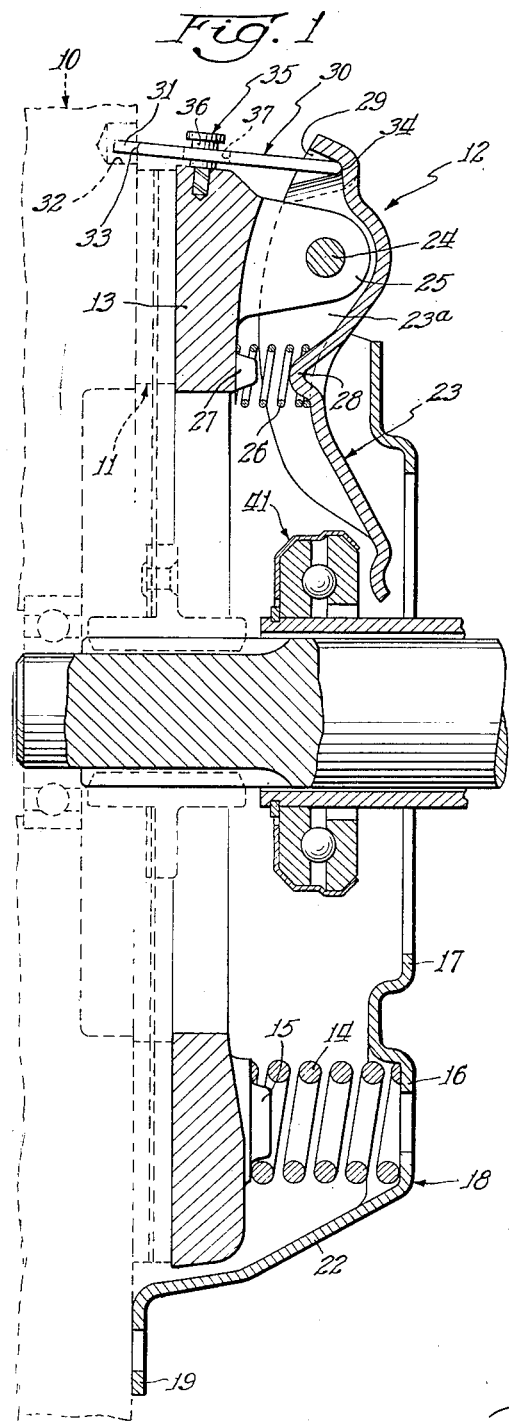
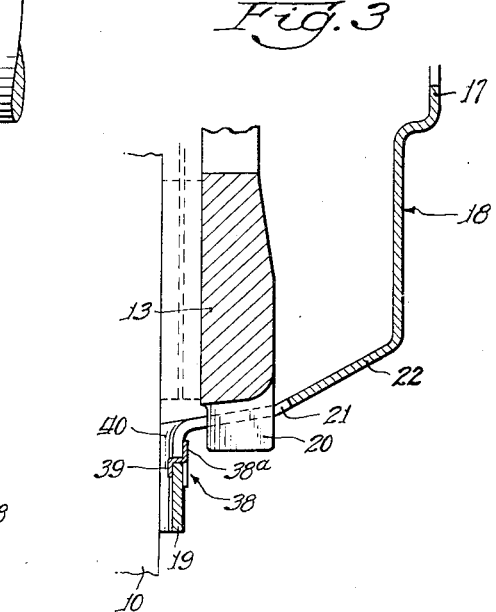
Inventor:
Harold V. Reed Feb. 13, 1951     H. V. REED     2,541,611
CLUTCH RELEASE
Filed May 16, 1946     2 Sheets-Sheet 2
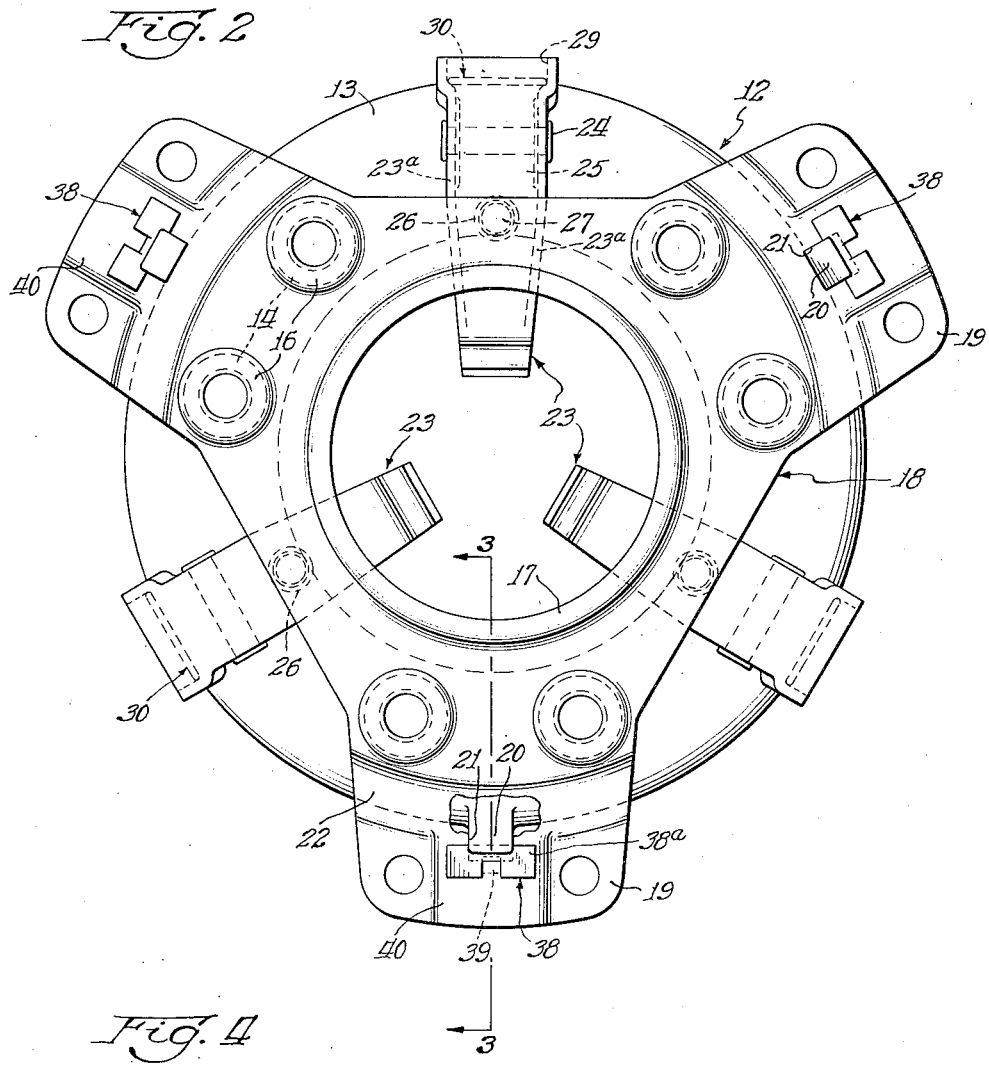
Inventor:
Harold V. Reed Patented Feb. 13, 1951

2,541,611

UNITED STATES PATENT OFFICE 2,541,611

CLUTCH RELEASE

Harold V. Reed, Chicago, Ill., assignor to Borg-Warner Corporation, Chicago, Ill., a corporation of Illinois Application May 16, 1946, Serial No. 670,223

7 Claims. (Cl. 192—99)

The present invention relates to clutches, preferably of the pull type release, for coupling the driving and driven shafts of a motor vehicle.

It is one of the principal objects of this invention to simplify the construction of a friction clutch such as contemplated herein, and to improve the efficiency, operation, and dependability of such friction clutch.

It is also a principal object of this invention to provide a clutch arrangement wherein the reaction, incident to the withdrawal of the pressure plate in releasing the clutch, is taken directly against the flywheel. In the conventional clutches, the spring reaction is usually taken against the cover and in order to prevent excessive deflection thereof, the material of the cover is made of a relatively heavy gauge. With the present arrangement, due to the fact that the reaction is taken directly against the flywheel instead of the cover, the latter is produced from a much thinner material than is the usual practice, thus reducing the weight thereof as well as decreasing the cost.

Another object of this invention is to provide an arrangement wherein the clutch release lever is fulcrumed on the pressure plate and a strut member is interposed between the radial outer region of the lever and the flywheel so that when the lever is rocked to release the clutch, as by a pull type release bearing, the pressure plate will shift rearward in opposition to the urge of the packing springs and the reaction will be taken directly against the flywheel.

It is another object of this invention to provide a unitary assembly which includes a pressure plate, release levers, cover member, and packing springs for the pressure plate which bear against the cover. In this particular assembly, the strut, which is interposed between the lever and flywheel, is maintained in position by a headed pin, or the like, projecting from the pressure plate. Also, the pressure plate is held against dislodgement out of the unitary cover assembly by stop clips mounted on the margins of the recesses through which the driving lugs of the pressure plate project. The foregoing arrangement provides a compact unit for ready handling and shipment, and for attachment to the flywheel.

Additional objects, aims, and advantages of the invention contemplated herein will be apparent to persons skilled in the art after the construction and operation of the clutch is understood from the within description.

It is preferred to accomplish the numerous objects hereof in substantially the manner hereinafter described and is more particularly pointed out in the appended claims. Reference is now made to the accompanying drawings, forming a part of this specification.

Fig. 1 is a view in axial section of a clutch assembly embodying the improvements contemplated herein;

Fig. 2 is a view in elevation of the clutch arrangement, looking forward toward the flywheel;

Fig. 3 is a fragmentary view in section taken on the plane of line 3—3 on Fig. 2, and Fig. 4 is a plan of the strut which is arranged between the release lever and flywheel.

The drawings are to be understood as being more or less of a schematic character for the purpose of disclosing a typical or preferred form of the improvements contemplated herein, and in these drawings like reference characters identify the same parts in the different views.

In Fig. 1, the rotatable flywheel is indicated schematically at 10 and the driven disk at 11. The details of these elements are of any of the conventional structures well known in the art, and need not be shown herein.

The assembly to which the present improvements are directed is identified generally as 12 and comprises a ring shaped pressure plate 13, normally urged toward the driven disk by the packing springs 14. These packing springs are engaged at their forward ends with seats 15 on the rear face of the pressure plate 13 and have their other or rear ends seated in dished bosses 16 in the radial back wall portion 17 of a cover identified generally as 18. Fig. 2 shows a cover 18 of a generally triangular or spider shape, the ends of the arms of which are blunt, and have annular radial flanges 19 which contact the rear face portion of flywheel 10 to which the cover is anchored by bolts or otherwise. The central region of the cover rear wall 17 has an opening to accommodate certain portions of the clutch mechanism, as seen in Fig. 1, and, as previously stated, this cover is made of relatively thin metal which reduces the overall weight of the assembly. The use of a thin metal cover is made possible by the fact that its principal function is to form a reaction for packing springs and to drive the pressure plate. This driving connection between the pressure plate 13 and the cover 18 is effected preferably by radial lugs 20 projecting from the peripheral margin of the pressure plate, which lugs are received in recesses 21 in the arcuate axially extending walls 22 next to the flanges 19 of the cover. As shown in Fig. 3, these recesses 21 extend into adjacent portions of the cover flanges 19, the purpose of which will later be explained.

The means for releasing the clutch comprise radially arranged release levers 23, preferably metal stampings which are fulcrumed, by means of pivot pins 24, on ears 25 projecting preferably from the rear face of pressure plate 13. The pivot pins preferably pass through the side walls or flanges 23a of levers 23, and their outer ends may be headed over as seen in Fig. 2 for retaining them in assembly. As seen in Fig. 2, these release levers 23 are located in the spaces between the radial arms of the spider-like member forming the cover 18. Between their fulcrums and their inner ends, these levers 23 are engaged by helical springs 26 which are positioned between the pressure plate and said inner regions of the levers. Stub-like seats 27 are formed on the pressure plate, radially inward from the ears 25, to receive the adjacent ends of the springs 26, and the levers 23 have embossments 28 therein that project toward the pressure plate to receive the other or rear ends of springs 26. By reason of this arrangement the radially inward ends of the levers 23 are urged in a rearward direction.

The radially outer end portions of release levers 23 have sockets 29 formed therein to receive the proximate ends of floating members which may take the form of metal struts 30. These struts preferably have the general shape shown in Fig. 4, and at their edges opposite the socket seats 29, they have lug or tongue portions 31, which project a proper distance to be received in holes 32 just outside the friction face of the flywheel 10. The edge of a strut on each side of the tongue 31 is of arcuate or convex cross section, as shown at 33, for effecting a rolling engagement of the strut with the surface of the flywheel at each side of a hole 32. The other or rear edge 34 of the strut is correspondingly made arcuate or convex in cross section as to effect a rolling engagement with the inner regions of the lever sockets 29. It will be apparent by reference to Fig. 1 that the struts 30 are positioned radially beyond the outer edge of pressure plate 13 and, being not directly attached to either the flywheel or the release levers, these struts 30 affect floating force transmitting connections between said levers and flywheel in the open spaces between the radial arms of the spider-like cover 18.

From the foregoing it will be seen that when the release bearing 41, of the pull type, is moved in a rearward direction (to the right in Fig. 1), its engagement with the inner ends of levers 23 will rock said levers on their fulcrums 24 which are on the pressure plate 13. This movement of levers 23 would tend to move their radial outer portions toward the flywheel were it not for the floating members or force transmitting struts 30 which bear against the flywheel. Instead, the levers move the pressure plate in a direction axially away from the flywheel and out of engagement with the driven friction disk thereby releasing the clutch and compressing the packing springs 14. Thus, the reaction of the clutch release is taken directly on the flywheel which has practically no deflection.

In order to prevent dislodgment of the struts 30, they are retained by means of headed pins 35 which have smooth cylindrical shank portions 36 that pass through slots 37 in said struts and have threaded ends that are screwed into the peripheral edge of pressure plate 13. The slots 37 permit movement of the pressure plate and pins during engagement and disengagement of the pressure plate 13 with the friction disk 11.

Also, suitable means are provided for preventing the pressure plate 13 being forced out of the cover assembly by the action of the packing springs 14 prior to attaching the unitary cover assembly to the flywheel. Such means comprise suitably shaped metal clips identified generally as 38, which are preferably comprised of metal plate 38a, each having an L-shaped flange 39 offset from the body plate so as to space the lateral member of the flange from the body plate a distance equal to, or even slightly less than, the thickness of the metal sheet forming the cover 18. As seen in Fig. 3, the clip is inserted over the radially outer edge of a recess 21 where it extends into the cover flange 19 so that the inner edge of the plate 38a projects radially inward and partly across the path of movement of the pressure plate driving lug 20. At the location of these clips 38, the cover flange 19 has slightly offset regions 40 at seen in Fig. 3 to prevent the clip flanges 39 and the clips being clamped between the proximate faces of the cover and flywheel when these members are bolted together. This arrangement permits shipment of the unitary cover assembly, as well as the installation of such assembly on the flywheel without the risk of the pressure plate 13 being dislodged. After the clutch cover assembly has been installed on the flywheel, these clips 38 may be readily removed if desired so that they may not interfere with the operation of the clutch.

While this invention has been described in detail in its present preferred form or embodiment, it will be apparent to persons skilled in the art, after understanding the improvements, that various changes and modifications may be made therein without departing from the spirit or scope thereof. It is aimed in the appended claims to cover all such changes and modifications.

I claim:

1. A friction clutch assembly comprising a rotatable flywheel; a clutch housing carried by said flywheel; an axially shiftable pressure plate within said housing having driving connection therewith; means defining seats in the rear face of said flywheel beyond the outer periphery of said pressure plate; spring means reacting on said housing for urging said pressure plate toward said flywheel; a clutch driven plate arranged to be packed between said flywheel and pressure plate; radial release levers fulcrumed on said pressure plate at location spaced circumferentially from the driving connection between said pressure plate and housing, said levers having socket end regions extending outwardly beyond the periphery of said pressure plate; a thrust bearing engageable with the radially inner end regions of said levers for operating said levers to move said pressure plate in a direction to release said driven plate; struts extending in an axial direction across the outer periphery of said pressure plate and being engaged at their ends respectively with said flywheel seats and said lever socket outer end regions, said struts defining floating force transmitting members whereby the reaction of clutch release is taken directly against said flywheel; and headed means projecting radially outward from said pressure plate in cooperative association with said struts for arresting dislodgement of said struts.

2. A friction clutch assembly as defined in claim 1 wherein there are tongues on the forward ends of the struts which are entered in the flywheel seats, and the rear edges of said struts are arcuate in cross-section for rolling action in the lever end sockets.

3. A friction clutch assembly as defined in claim 1 wherein the headed means comprise bolts the shanks of which pass through recesses in the struts and are threaded into the outer peripheral edge of the pressure plate.

4. In a friction clutch assembly, a rotatable flywheel; a spring urged axially shiftable annular pressure plate movable in a direction to pack a driven clutch disc against said flywheel; radial release levers fulcrumed on said pressure plate, said levers having socket end regions extending outwardly beyond the periphery of said pressure plate; floating struts extending in axial directions in planes radially beyond the outer periphery of said pressure plate and contacting at their respective ends directly against said flywheel and the socket outer end regions of said levers; and means cooperatively associated with said pressure plate and said struts for arresting dislodgement of said struts.

5. A friction clutch assembly as defined in claim 4 wherein the strut arresting means comprise headed bolts extending radially outward from the outer periphery of the pressure plate with their shanks freely engaged in recesses in the struts.

6. A unitary clutch assembly comprising an axially movable pressure plate having driving lugs projecting therefrom; a housing for said pressure plate having apertures through which said driving lugs project; springs reacting on said housing for urging said pressure plate in a direction away from said housing; release levers fulcrumed on said pressure plate within said housing; and clips mounted in said cover apertures in the path of axial movement of said pressure plate lugs, said clips being effective to retain said pressure plate, said springs, and said levers in a unitary assembly with said housing prior to mounting such clutch assembly on a driving member.

7. A unitary clutch assembly comprising a pressure plate adapted for axial movement toward and from a driving member, said pressure plate having driving lugs projecting therefrom; a housing for said pressure plate adapted for attachment to the driving member and having recesses into which said driving lugs project; springs reacting on said housing for urging said pressure plate in a direction away from said housing; release levers fulcrumed on said pressure plate within said housing; floating struts extending in an axial direction beyond the outer periphery of said pressure plate and engaged at their rear ends with the outer end regions of said release levers, the forward ends of said struts being adapted for contact with the driving member; headed bolts extending radially outward from the outer periphery of said pressure plate with their shanks engaged in recesses in said struts thereby to arrest dislodgement of said struts; and clips mounted in said cover apertures and defining stops engaged by said pressure plate lugs to arrest movement of said pressure plate in a direction away from said housing, said clips being effective to retain said pressure plate, said springs, and said levers in a unitary assembly with said housing prior to mounting such unitary assembly on the driving member.

HAROLD V. REED.

REFERENCES CITED

The following references are of record in the file of this patent:

UNITED STATES PATENTS

| Number | Name | Date |
|---|---|---|
| 1,455,848 | Moorehouse | May 22, 1923 |
| 1,879,569 | Snow | Sept. 27, 1932 |
| 2,076,425 | Brock | Apr. 6, 1937 |
| 2,259,933 | Holloway | Oct. 21, 1941 |
| 2,366,643 | Nutt | Jan. 2, 1945 |